(12) United States Patent
Puiu et al.

(10) Patent No.: US 8,937,413 B2
(45) Date of Patent: Jan. 20, 2015

(54) ELECTRIC MOTOR WITH COOLANT SHIELD ASSEMBLY

(71) Applicants: Dumitru Puiu, Sterling Heights, MI (US); Richard Ondrejko, Gaylord, MI (US); Dale E Martin, Novi, MI (US)

(72) Inventors: Dumitru Puiu, Sterling Heights, MI (US); Richard Ondrejko, Gaylord, MI (US); Dale E Martin, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 249 days.

(21) Appl. No.: 13/647,906

(22) Filed: Oct. 9, 2012

(65) Prior Publication Data

US 2014/0097713 A1    Apr. 10, 2014

(51) Int. Cl.
*H02K 9/19* (2006.01)
*H02K 3/24* (2006.01)
*H02K 5/20* (2006.01)

(52) U.S. Cl.
USPC .................................. 310/54; 310/58; 310/85

(58) Field of Classification Search
CPC ......... H02K 9/19; H02K 9/193; H02K 9/005; H02K 3/24; H02K 5/20
USPC ....................... 310/52–65, 60 R, 214, 260, 85
See application file for complete search history.

(56) References Cited

U.S. PATENT DOCUMENTS

| 3,648,085 | A  | * | 3/1972 | Fujii ................................ 310/54 |
| 3,663,127 | A  |   | 5/1972 | Cheers |
| 5,519,269 | A  | * | 5/1996 | Lindberg ......................... 310/58 |
| 7,479,716 | B2 |   | 1/2009 | El-Antably et al. |
| 7,508,100 | B2 |   | 3/2009 | Foster |
| 7,538,457 | B2 |   | 5/2009 | Holmes et al. |
| 2003/0057797 | A1 | * | 3/2003 | Kaneko et al. ................. 310/217 |
| 2009/0121562 | A1 |   | 5/2009 | Yim |
| 2010/0038981 | A1 |   | 2/2010 | Urano et al. |

* cited by examiner

*Primary Examiner* — Michael Andrews
(74) *Attorney, Agent, or Firm* — Ralph E Smith

(57) ABSTRACT

An electric motor assembly includes a shield that extends about a sector of the winding head to be disposed axially outboard of the outer axial end of the winding head and radially inboard of the inner diameter portion of the winding head. The shield defines a reservoir in which the sector of the winding head is received. The reservoir is operable to receive the coolant for cooling the winding head. Additionally, the motor assembly includes at least one sealing member that substantially seals at least one of the slots formed in an inner diameter portion of the stator core. The sealing member is operable to contain the coolant within the corresponding longitudinal opening and the reservoir.

18 Claims, 3 Drawing Sheets

ELECTRIC MOTOR WITH COOLANT SHIELD ASSEMBLY

FIELD

The present disclosure relates to an electric motor and, more particularly, to an electric motor with a coolant shield assembly.

BACKGROUND

Electric motors have been proposed for a variety of uses. Electric motors can include a stator and a rotor. Windings (e.g., copper wires) can be wound about the stator. During operation of the motor, heat can be generated in the windings. By transferring this heat away from the windings, the motor can operate more efficiently.

SUMMARY

An electric motor assembly that is operable to be cooled by a coolant is disclosed. The electric motor assembly includes a stator core that defines a longitudinal axis and that is hollow to define an inner diameter surface. The stator core also includes an axial end surface, and the stator core includes a plurality of longitudinal openings that define a respective slot on the inner diameter surface. Moreover, the motor assembly includes a winding assembly that is wound on the stator core to define a longitudinal portion and a winding head. The longitudinal portion is received within the plurality of longitudinal openings. The winding head is exposed from the axial end surface of the stator core. The winding head defines an outer axial end and an inner diameter portion. The motor assembly also includes a shield that extends about a sector of the winding head to be disposed axially outboard of the outer axial end of the winding head and radially inboard of the inner diameter portion of the winding head. The shield defines a reservoir in which the sector of the winding head is received. The reservoir is operable to receive the coolant for cooling the winding head. Additionally, the motor assembly includes at least one sealing member that substantially seals at least one of the slots. The sealing member is operable to contain the coolant within the corresponding longitudinal opening and the reservoir.

Furthermore, an electric motor assembly is disclosed that includes a stator core that defines a longitudinal axis and that is hollow to define an inner diameter surface. The stator core also includes an axial end surface. The stator core includes a plurality of longitudinal openings that define a respective slot on the inner diameter surface. The motor assembly also includes a winding assembly that is wound on the stator core to define a longitudinal portion and a winding head. The longitudinal portion is received within the plurality of longitudinal openings. The winding head is exposed from the axial end surface of the stator core, and the winding head defines an outer axial end and an inner diameter portion. Moreover, the motor assembly includes a shield that extends about a sector of the winding head to be disposed axially outboard of the outer axial end of the winding head and radially inboard of the inner diameter portion of the winding head. The shield defines a reservoir in which the sector of the winding head is received. Additionally, the motor assembly includes at least one sealing member that substantially seals at least one of the slots. Furthermore, the motor assembly includes a coolant system with an outlet member that delivers a coolant into the reservoir. A flow path of the coolant is defined from the sector of the winding head to the longitudinal portion of the winding assembly.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
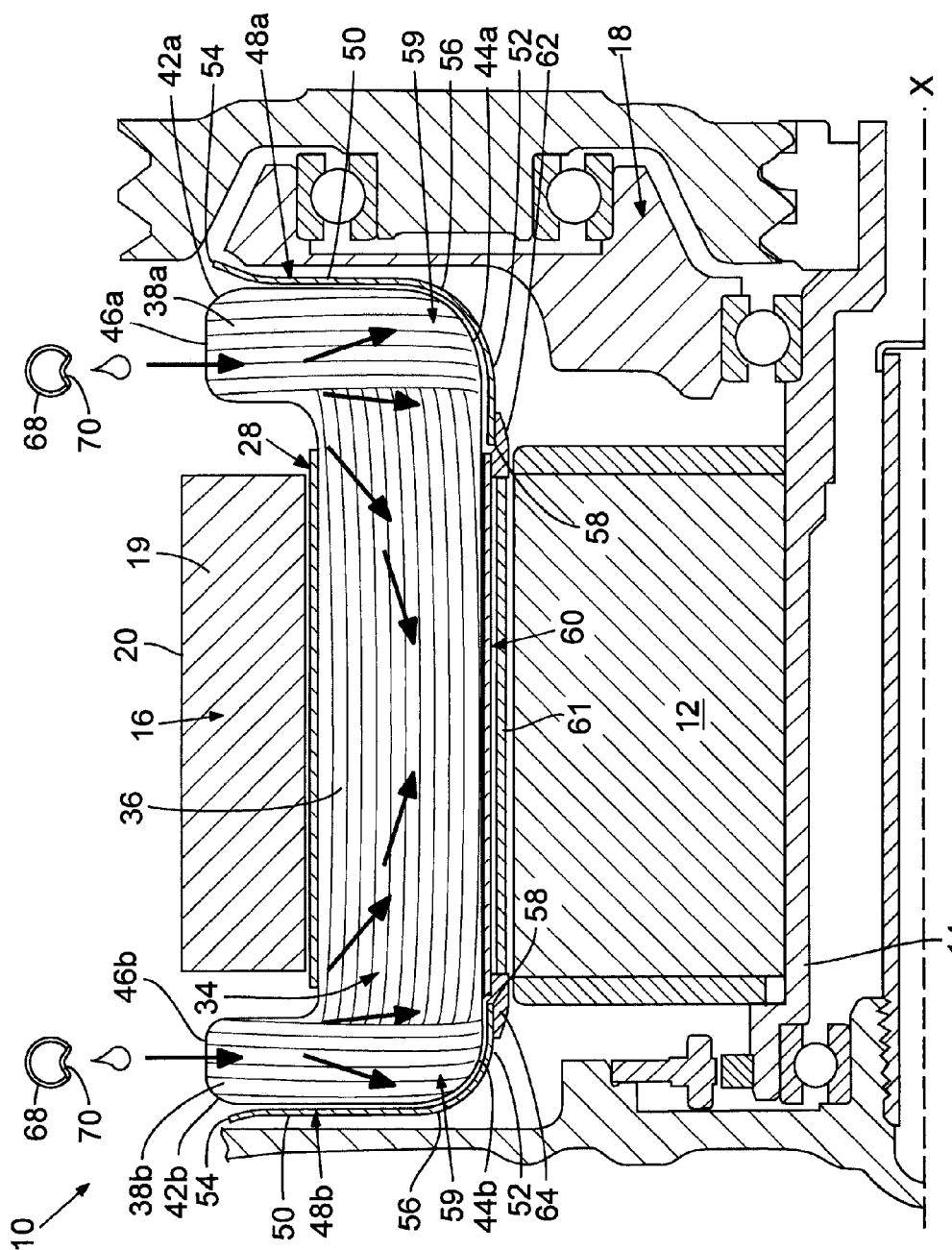
FIG. 1 is an axial section view of an electric motor assembly with a cooling shield assembly according to various exemplary embodiments of the present disclosure.

Referring initially to FIG. 1, a partial section view of an electric motor assembly 10 is shown. The motor assembly 10 can be included in a vehicle (e.g., a gasoline/electric hybrid car, truck, van, etc.). Also, the motor assembly 10 can be employed for outputting torque that is transferred to the wheels of the vehicle, or the motor assembly 10 can be employed for generating electrical power that is stored in a battery. However, it will be appreciated that the motor assembly 10 can be employed in any suitable environment and can be used in any suitable manner without departing from the scope of the present disclosure.

The motor assembly 10 can generally include a rotor 12 that is operatively coupled to an output shaft 14. The output shaft 14 can be supported and operatively connected to surrounding structure (e.g., gear(s), bearings, motor housing, etc.), which is generally indicated at 18 in FIG. 1. It will be appreciated that the rotor 1 and surrounding structure 18 can be of a known type.

Figure 2:
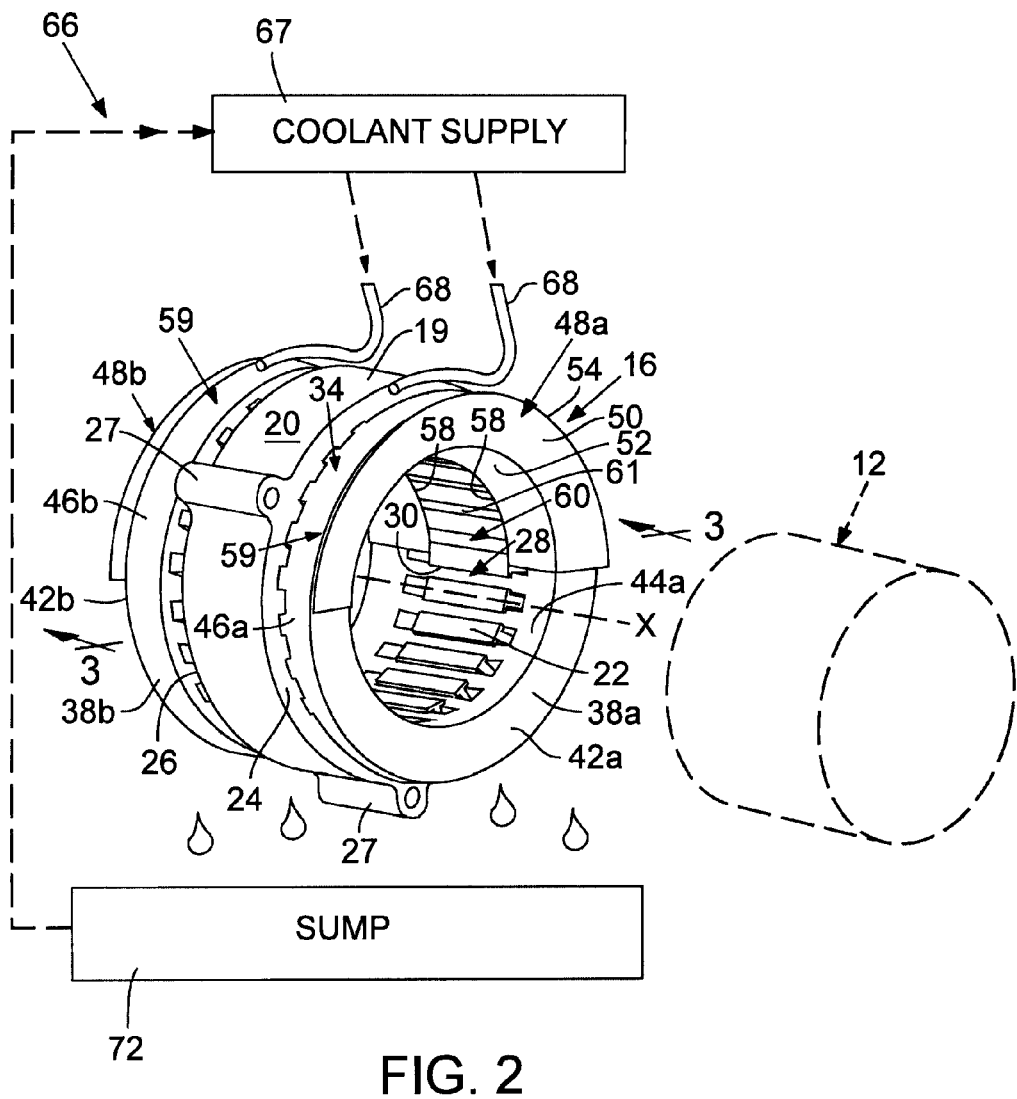
FIG. 2 is a perspective view of the stator assembly of the electric motor assembly of FIG. 1 wherein a coolant system and a rotor of the motor assembly are shown schematically in relation to the stator assembly.
Figure 3:
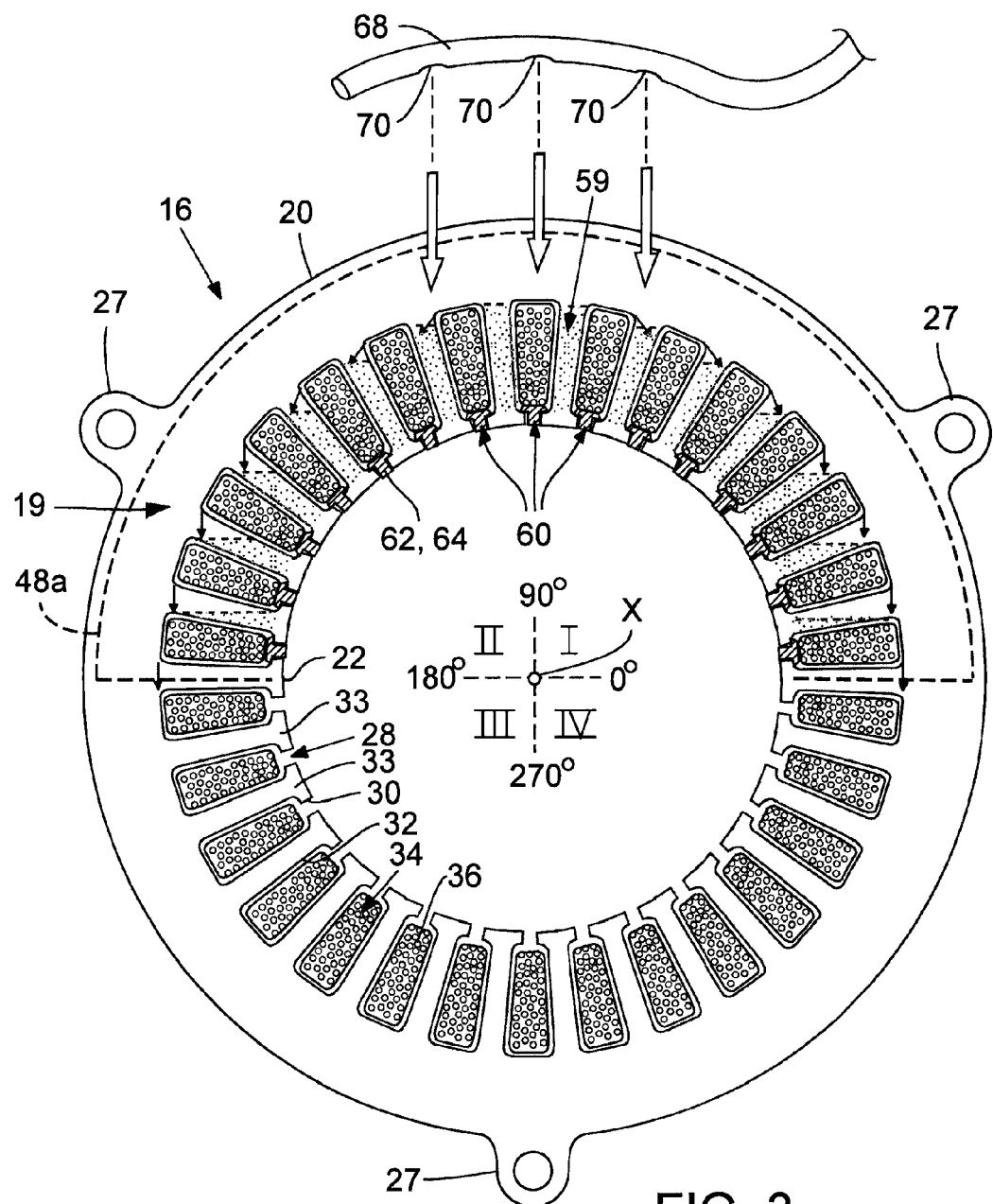
FIG. 3 is a section view of the stator assembly taken along line 3-3 of FIG. 2.

As shown in FIGS. 1-3, the motor assembly 10 can also generally include a stator assembly 16. The stator assembly 16 can generally include a stator core 19 and a winding assembly 34. The winding assembly 34 can include a plurality of electrically conductive wires (e.g., copper wires) that are wound about the stator core 19. (The winding assembly 34 is illustrated as a group of wound wires in FIGS. 1 and 3, but the winding assembly 34 is illustrated in a simplified manner as a unitary mass in FIG. 2.) The winding assembly 34 can be wound about the core 19 in a known manner. When power is supplied to the winding assembly 34, electromagnetic forces can be generated for drivingly rotating the rotor 12 and, thus, the shaft 14. This rotation of the shaft 14 can cause driving rotation of the surrounding structure 18 for transferring torque, etc. It will be appreciated that the stator assembly 16 and the rotor 12 can include any number of poles and/or any other variations of known electrical motors. Moreover, the winding assembly 34 can be wound in any known manner including, but not limited to, a distributed, concentrated, or hairpin winding configuration.

Moreover, the motor assembly 10 can include a coolant system 66 (FIG. 2) which can supply and deliver a coolant (e.g., oil from a transmission system or other system) to the winding assembly 34 as will be discussed in greater detail below. The coolant system 66 can be a passive coolant system (i.e., can deliver coolant via the force of gravity and capillary flow) instead of an active coolant system (i.e., one that delivers coolant using a pump or vacuum source). The coolant can remove heat from (i.e., cool) the winding assembly 34 as will be discussed in greater detail below. As such, the motor assembly 10 can operate with relatively high efficiency. Thus, if the motor assembly 10 is employed in a gasoline/electric hybrid vehicle, the greater efficiency of the motor assembly 10 can result in fuel savings.

Additionally, the motor assembly 10 can include one or more shields 48a, 48b (FIGS. 1 and 2) and one or more sealing members 60. The shields 48a, 48b and sealing members 60 can contain and direct flow of the coolant delivered from the coolant system 66 as will be discussed in greater detail below. Thus, as will be discussed in greater detail below, the shields 48a, 48b and sealing members 60 can increase the coolant's exposure time to the winding assembly 34. As a result, more heat can be absorbed and removed by the coolant, thereby increasing efficiency even further.

The stator assembly 16 will now be discussed in detail. As seen in FIG. 2, the stator core 19 can be hollow and cylindrical and can define a longitudinal axis X. As such, the core 19 can include an outer diameter surface 20, an inner diameter surface 22, a first axial end surface 24, and a second axial end surface 26. The core 19 can be made out of any suitable material. The core 19 can also include one or more (e.g., three) attachment regions 27 for attaching to the surrounding structure 18 (e.g., via bolts or other fasteners).

As shown in FIGS. 2 and 3, the core 19 can also include a plurality of longitudinal openings 28. Each of the openings 28 can be elongate and can extend substantially parallel to the axis X. The openings 28 can be defined on the inner diameter surface 22 and can extend continuously from the first axial end surface 24 to the second axial end surface 26. The openings 28 can also be spaced substantially evenly circumferentially about the inner diameter surface 22. Also, as shown in FIG. 3, the openings 28 can vary in width in the radial direction. For instance, the openings 28 can each define a relatively narrow slot 30 (i.e., a slot 30 that has a relatively small angular width relative to the axis X). Also, as the openings 28 extend radially outward, the openings 28 can taper and increase in (angular) width to define a pocket 32 therein. Thus, as shown in FIG. 3, a plurality of teeth 33 with generally T-shaped cross sections can be defined on the inner diameter surface 22. It will be appreciated that the core 19 can include any suitable number of openings 28 (e.g., based on the number of poles of the motor assembly 10) without departing from the scope of the present disclosure.

As mentioned above, the winding assembly 34 can include a plurality of conductive wires that are wound about the core 19 in a known manner. (Again, the winding assembly 34 is illustrated in a simplified manner in FIG. 2, but it should be understood that the assembly 34 is formed from a plurality of wound wires to appear, as a whole, as shown in FIG. 2.)

Portions of the winding assembly 34 (so-called "longitudinal portions" 36) can extend longitudinally and parallel to the axis X to be received and enclosed within respective pockets 32 of the core 19. Other portions of the winding assembly 34 (so-called "winding heads" 38a, 38b) can be exposed from the core 19. The winding heads 38a, 38b can be generally annular in shape and can be disposed adjacent and coaxial with the axial end surfaces 24, 26, respectively. Thus, the winding heads 38a, 38b can define respective outer axial ends 42a, 42b, inner diameter portions 44a, 44b, and outer diameter portions 46a, 46b. It will be appreciated that the longitudinal portions 36 can extend longitudinally between the winding heads 38a, 38b. Also, relatively small ends of the longitudinal portions 36 may be partially exposed from the axial end surfaces 24, 26 as shown in FIG. 2. The winding assembly 34 can additionally include sections of electrical insulation as necessary to prevent electrical short circuiting.

Thus, the winding heads 38a, 38b can extend annularly between quadrants I, II, III, and IV (FIG. 3). It will be appreciated that the winding heads 38a, 38b within quadrants I and II are disposed generally at the upper portion of the motor assembly 10 (i.e., the upper 180°). Also, the winding heads 38a, 38b within quadrants III and IV are disposed generally at the lower portion of the motor assembly 10 (i.e., the lower 180°). It will also be appreciated that the motor assembly 10 can be positioned within the vehicle or other surrounding structure 18 such that the direction of gravity is substantially from the 90° position to the 270° position shown in FIG. 3.

Moreover, the coolant system 66 can include a coolant supply 67 that supplies a coolant (e.g., oil) to the motor assembly 10. The coolant supply 67 can be an offshoot of a vehicle's transmission system for supplying transmission oil to the motor assembly 10 for cooling in some embodiments. In additional embodiments, the coolant supply 67 can be dedicated only for supplying coolant to the motor assembly 10. The coolant system 66 can also include one or more outlet members 68, such as rigid pipes that are curved circumferentially about the axis X (FIGS. 2 and 3). The outlet members 68 can include one or more (e.g., three or more) ports 70 that are spaced from each other along the longitudinal axis of the outlet members 68. The outlet members 68 can be radially spaced away from and disposed generally above the upper portion (i.e., generally at the 90° position) of the winding heads 38a, 38b. As such, coolant can drip or otherwise flow from the ports 70 downward radially toward the axis X and directly onto the winding heads 38a, 38b largely under the force of gravity (i.e., passively and without the use of a pump). The coolant can flow over the winding heads 38a, 38b and the longitudinal portions 36 along a flow path, which will be described in detail below. Then, the coolant can drip or otherwise flow off the winding assembly 34 and into a sump 72 (FIG. 2). The sump 72 can be fluidly connected to the coolant supply 67 such that coolant can be returned cyclically thereto.

Referring to FIGS. 1 and 2, the shields 48a, 48b will be discussed in greater detail. As shown, each shield 48a, 48b can include an end plate 50 and a collar 52, both of which are relatively thin-walled bodies. The end plate 50 can be semi-annular and can define an outer (radial) edge 54 and an inner (radial) edge 56. The collar 52 can also be semi-annular, but the collar 52 can extend transversely from the inner (radial) edge 56 of the end plate 50 and can terminate at a terminal end 58 (FIG. 1). As shown in FIG. 1, the end plate 50 and collar 52 can be integrally connected so as to be monolithic. The end plate 50 and collar 52 can also be made out of any suitable material, such as a polymeric material.

The shields 48a, 48b can be arranged relative to the winding assembly 34 and the core 19 such that the end plates 50 extend substantially radially away from the axis X while the collars 52 extend generally longitudinally along (e.g., substantially parallel) to the axis X. The collar 52 of the shield 48a can also extend generally toward the collar 52 of the shield 48b as shown in FIG. 1. Moreover, the end plates 50 can be disposed axially outboard of the respective outer axial ends 42a, 42b of the winding heads 38a, 38b. Also, the collars 52 can be disposed radially inboard of the respective inner diameter portions 44a, 44b of the winding heads 38a, 38b. Accordingly, as shown in FIG. 2, the shields 48a, 48b (in cooperation with the axial end surfaces 24, 26 of the core 19) can define a reservoir 59 that receives and partially encloses the respective winding heads 38a, 38b.

In some embodiments represented in FIGS. 1 and 2, the outer edge 54 of the shields 48a, 48b can be disposed at an equal or greater radial distance in comparison with the outer diameter portion 46a, 46b of the winding heads 38a, 38b. Also, as shown in FIG. 1, the outer edge 54 of the shields 48a, 48b can be flared outward away from the core 19 to thereby enlarge the reservoir 59.

As shown in FIGS. 2 and 3, the shields 48a, 48b can span circumferentially about approximately a one hundred eighty degree (180°) sector of the respective winding head 38a, 38b (i.e., across the entire quadrants I and II shown in FIG. 3). Accordingly, the shields 48a, 48b can span across substantially the entire upper circumferential half of the respective winding head 38a, 38b and can leave the remaining lower half exposed. However, it will be appreciated that the shields 48a, 48b can span across any suitable sector (i.e., across any suitable angular range) of the winding heads 38a, 38b.

As shown in FIGS. 1 and 3, the sealing members 60 can substantially seal off respective ones of the slots 30 on the inner diameter surface 22 of the stator core 19. In some embodiments shown in FIG. 1, the sealing members 60 can each include an elongate sealing strip 61, a first terminal end member 62 and a second terminal end member 64. The sealing strip 61 can be longitudinally straight with a length and width corresponding to that of the slots 30. Also, the end members 62, 64 can be plugs that attach directly to the terminal ends 58 of the collars 52. The end members 62, 64 can also have substantially T-shaped longitudinal cross sections as shown in FIG. 3. Thus, the sealing strip 61 and end members 62, 64 can cooperate to seal off respective ones of the slots 30.

Accordingly, as shown in FIG. 3, when coolant is delivered to the winding heads 38a, 38b from the outlet members 68 (substantially at the range of 80° to 100°), the coolant can flow circumferentially and downward along a flow path over the outer diameter portion 46a, 46b of the winding heads 38a, 38b. Coolant can also temporarily pool within the reservoir 59, between the axial end surfaces 24, 26 and the respective winding heads 38a, 38b to flow over the longitudinal portions 36 of the winding assembly 34. Gravity can also cause the coolant to flow circumferentially downward to adjacent longitudinal portions 36 as shown in FIG. 3. Moreover, as shown in FIG. 1, capillary flow can cause the coolant to flow within the pockets 32 of the stator core 19 such that the coolant can cool the longitudinal portions 36 disposed therein.

The coolant can eventually flow out from the reservoir 59, and capillary flow can cause the coolant to flow over and between the wiring of the winding assembly 34 disposed outside the reservoir 59 (i.e., the sectors of the winding heads 38a, 38b and longitudinal portions 36 lying in quadrants III and IV of FIG. 3). Then, the coolant can drip or otherwise flow away from the stator assembly 16 into the sump 72 to be returned cyclically to the coolant supply 67.

Accordingly, the shields 48a, 48b and sealing member 60 can substantially increase the time that the coolant is exposed to the winding assembly 34. As such, the winding assembly 34 can be cooled more effectively, and the motor assembly 10 can operate more efficiently as a result. Additionally, because the shield 48a, 48b and the sealing members 60 span across only a portion of the stator assembly 16 (i.e., across only a sector of the stator assembly 16), the weight of the motor assembly 10 is unlikely to be significantly increased. Thus, if the motor assembly 10 is utilized in a hybrid vehicle, fuel costs can be significantly reduced.

What is claimed is:

1. An electric motor assembly that is operable to be cooled by a coolant, the electric motor assembly comprising:
  a stator core that defines a longitudinal axis and that is hollow to define an inner diameter surface, the stator core also including an axial end surface, the stator core including a plurality of longitudinal openings that define a respective slot on the inner diameter surface;
  a winding assembly that is wound on the stator core to define a longitudinal portion and a winding head, the longitudinal portion being received within the plurality of longitudinal openings, the winding head being exposed from the axial end surface of the stator core, the winding head defining an outer axial end and an inner diameter portion;
  a shield that extends about a sector of the winding head to be disposed axially outboard of the outer axial end of the winding head and radially inboard of the inner diameter portion of the winding head, the sector spanning an angle of approximately one hundred eighty degrees (180°) about the winding head, the shield defining a reservoir in which the sector of the winding head is received, the reservoir operable to receive the coolant for cooling the winding head; and
  at least one sealing member that substantially seals at least one of the slots, the at least one sealing member operable to contain the coolant within the corresponding longitudinal opening and the reservoir.

2. The electric motor assembly of claim 1, wherein the shield includes an end plate and a collar, the end plate extending radially away from the longitudinal axis and spanning angularly about the longitudinal axis across the sector of the outer axial end of the winding head, the collar extending away from the end plate and along the longitudinal axis to extend over the inner diameter portion of the winding head.

3. The electric motor assembly of claim 2, wherein the end plate and the collar are integrally connected so as to be monolithic.

4. The electric motor assembly of claim 2, wherein the collar is connected to and extends from an inner edge of the end plate.

5. The electric motor assembly of claim 4, wherein an outer edge of the end plate is flared outward away from the stator core.

6. The electric motor assembly of claim 1, wherein the at least one sealing member includes at least one elongate sealing strip that seals off a single one of the slots, an end of the sealing strip being attached to the shield.

7. An electric motor assembly comprising:
  a stator core that defines a longitudinal axis and that is hollow to define an inner diameter surface, the stator core also including an axial end surface, the stator core including a plurality of longitudinal openings that define a respective slot on the inner diameter surface;
  a winding assembly that is wound on the stator core to define a longitudinal portion and a winding head, the longitudinal portion being received within the plurality of longitudinal openings, the winding head being exposed from the axial end surface of the stator core, the winding head defining an outer axial end and an inner diameter portion;

a shield having a limited circumferential extent and an arcuate shape when viewed along the longitudinal axis that extends about a sector of the winding head and that is disposed axially outboard of the outer axial end of the winding head and radially inboard of the inner diameter portion of the winding head, the sector spanning an angle that is less than three hundred sixty degrees (360°) about the winding head, the shield defining a reservoir in which the sector of the winding head is received;

at least one sealing member that substantially seals at least one of the slots; and a coolant system with an outlet member that delivers a coolant into the reservoir, a flow path of the coolant defined from the sector of the winding head to the longitudinal portion of the winding assembly.

8. The electric motor assembly of claim 7, wherein the shield includes an end plate and a collar, the end plate extending radially away from the longitudinal axis and spanning angularly about the longitudinal axis across the sector of the outer axial end of the winding head, the collar extending away from the end plate and along the longitudinal axis to extend over the inner diameter portion of the winding head.

9. The electric motor assembly of claim 8, wherein the end plate and the collar are integrally connected so as to be monolithic.

10. The electric motor assembly of claim 8, wherein the collar is connected to and extends from an inner edge of the end plate.

11. The electric motor assembly of claim 10, wherein an outer edge of the end plate is flared outward away from the stator core.

12. The electric motor assembly of claim 7, wherein the sector spans an angle of approximately one hundred eighty degrees (180°) about the winding head.

13. The electric motor assembly of claim 7, wherein the at least one sealing member includes at least one elongate sealing strip that seals off a single one of the slots, an end of the sealing strip being attached to the shield.

14. The electric motor assembly of claim 7, wherein the outlet member includes a tube that curves about the longitudinal axis and that is spaced from the winding head, the tube including a port that delivers the coolant to fall from the tube to the reservoir.

15. The electric motor assembly of claim 7, wherein the flow path of the coolant includes capillary flow of the coolant to a portion of the winding assembly outside the sector.

16. The electric motor assembly of claim 7, wherein the coolant system also includes a sump, the outlet member and the sump being on opposite sides of the longitudinal axis.

17. The electric motor assembly of claim 7, wherein the shield is made from a polymeric material.

18. The electric motor assembly of claim 7, wherein the at least one sealing member is made from a polymeric material.

* * * * *